United States Patent
Mamrak et al.

(10) Patent No.: US 11,141,918 B2
(45) Date of Patent: Oct. 12, 2021

(54) POWDER REFILL SYSTEM FOR AN ADDITIVE MANUFACTURING MACHINE

(71) Applicant: General Electric Company, Schenectady, NY (US)

(72) Inventors: Justin Mamrak, Loveland, OH (US); MacKenzie Ryan Redding, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/761,758

(22) PCT Filed: Nov. 2, 2018

(86) PCT No.: PCT/US2018/058866
§ 371 (c)(1),
(2) Date: May 5, 2020

(87) PCT Pub. No.: WO2019/094278
PCT Pub. Date: May 16, 2019

(65) Prior Publication Data
US 2020/0262147 A1    Aug. 20, 2020

Related U.S. Application Data

(60) Provisional application No. 62/584,152, filed on Nov. 10, 2017.

(51) Int. Cl.
*B29C 64/329* (2017.01)
*B33Y 30/00* (2015.01)
(Continued)

(52) U.S. Cl.
CPC ............ *B29C 64/329* (2017.08); *B22F 10/20* (2021.01); *B29C 64/153* (2017.08);
(Continued)

(58) Field of Classification Search
CPC ... B29C 64/329; B29C 64/153; B29C 64/255; B29C 64/393; B29C 64/343;
(Continued)

(56) References Cited

U.S. PATENT DOCUMENTS 4,005,956 A * 2/1977 Inoue .................... B22F 1/0081
425/78
5,837,960 A   11/1998 Lewis et al.
(Continued)

FOREIGN PATENT DOCUMENTS

EP        1700686 A2    9/2006
JP      2011006719 A    1/2011

OTHER PUBLICATIONS

PCT International Search Report Corresponding to PCT/US2018/058866 on Feb. 4, 2019.
(Continued)

*Primary Examiner* — Nahida Sultana
(74) *Attorney, Agent, or Firm* — Dority & Manning, P.A.

(57) ABSTRACT

An additive manufacturing machine (910) includes a build unit (920) including a powder dispenser (906) having a hopper (904) for receiving a volume of additive powder (902). A powder supply system (1000) includes a powder supply source (940) and a conveyor (1024) for transporting dispensed additive powder (902) to the hopper (904). A supply sensing system (1060) monitors the additive powder (902) that is dispensed from the powder supply source (940) and transported to the hopper (904) and a hopper sensing system (1040) monitors the additive powder (902) within the hopper (904). Each of these systems includes one or more powder level sensors (1042, 1044, 1062), weight sensors (1050, 1064), and/or vision systems (1054, 1070) for monitoring the additive powder (902).

15 Claims, 9 Drawing Sheets

(51) Int. Cl.
*B33Y 50/02* (2015.01)
*B29C 64/153* (2017.01)
*B29C 64/255* (2017.01)
*B29C 64/393* (2017.01)
*B22F 10/20* (2021.01)
*B22F 10/30* (2021.01)

(52) U.S. Cl.
CPC .......... *B29C 64/255* (2017.08); *B29C 64/393* (2017.08); *B33Y 30/00* (2014.12); *B33Y 50/02* (2014.12); *B22F 10/30* (2021.01)

(58) Field of Classification Search
CPC ......... B33Y 30/00; B33Y 50/02; B33Y 40/00; B22F 3/1055; B22F 2003/1057; B22F 2003/1056; B22F 2999/00; Y02P 10/25
See application file for complete search history.

(56) References Cited

U.S. PATENT DOCUMENTS

| | | |
|---|---|---|
| 6,046,426 A | 4/2000 | Jeantette et al. |
| 6,672,343 B1 | 1/2004 | Perret et al. |
| 7,045,738 B1 | 5/2006 | Kovacevic et al. |
| 7,887,316 B2 * | 2/2011 | Cox ........................ B01F 3/188 425/215 |
| 8,260,447 B2 | 9/2012 | Mattes et al. |
| 2008/0187423 A1 * | 8/2008 | Mauchle ............... B05B 12/004 414/415 |
| 2008/0241404 A1 | 10/2008 | Allaman et al. |
| 2009/0169664 A1 | 7/2009 | Cox |
| 2016/0074938 A1 * | 3/2016 | Kitani ................. B23K 26/342 419/7 |
| 2016/0193696 A1 | 7/2016 | McFarland et al. |
| 2016/0199911 A1 | 7/2016 | Dave et al. |
| 2016/0339519 A1 | 11/2016 | Sargent |
| 2017/0028468 A1 | 2/2017 | Dellea et al. |
| 2017/0072636 A1 | 3/2017 | Ng et al. |
| 2017/0259507 A1 * | 9/2017 | Hocker ................... B29C 64/35 |
| 2018/0111319 A1 * | 4/2018 | Brezoczky .............. B23K 26/14 |
| 2018/0281284 A1 * | 10/2018 | Elgar ................... B29C 64/364 |

OTHER PUBLICATIONS

Yang et al., Metering and Dispensing of Powder, The Quest for New Solid Freeforming Techniques, Powder Technology, vol. 178, No. 1, Sep. 5, 2007, pp. 56-72. (Abstract Only).

* cited by examiner

POWDER REFILL SYSTEM FOR AN ADDITIVE MANUFACTURING MACHINE

PRIORITY INFORMATION

The present applicant claims priority to U.S. Provisional Patent Application Ser. No. 62/584,152 titled "Powder Refill System for an Additive Manufacturing Machine" filed on Nov. 10, 2017, the disclosure of which is incorporated by reference herein.

FIELD

The present disclosure generally relates to methods and systems adapted to perform additive manufacturing (AM) processes, for example by direct melt laser manufacturing (DMLM), on a larger scale format.

BACKGROUND

Additive manufacturing (AM) processes generally involve the buildup of one or more materials to make a net or near net shape (NNS) object, in contrast to subtractive manufacturing methods. Though "additive manufacturing" is an industry standard term (ISO/ASTM52900), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model.

A particular type of AM process uses an energy source such as an irradiation emission directing device that directs an energy beam, for example, an electron beam or a laser beam, to sinter or melt a powder material, creating a solid three-dimensional object in which particles of the powder material are bonded together. AM processes may use different material systems or additive powders, such as engineering plastics, thermoplastic elastomers, metals, and ceramics. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

During direct metal laser sintering (DMLS) or direct metal laser melting (DMLM), an apparatus builds objects in a layer-by-layer manner by sintering or melting a powder material using an energy beam. The powder to be melted by the energy beam is spread evenly over a powder bed on a build platform, and the energy beam sinters or melts a cross sectional layer of the object being built under control of an irradiation emission directing device. The build platform is lowered and another layer of powder is spread over the powder bed and object being built, followed by successive melting/sintering of the powder. The process is repeated until the part is completely built up from the melted/sintered powder material.

After fabrication of the part is complete, various post-processing procedures may be applied to the part. Post processing procedures include removal of excess powder by, for example, blowing or vacuuming. Other post processing procedures include a stress release process. Additionally, thermal and chemical post processing procedures can be used to finish the part.

Certain conventional AM machines include a build unit that is supported by an overhead gantry. The gantry defines a build area and facilitates movement of the build unit within the build area to repeatedly deposit layers of powder and fuse portions of each layer to build one or more components. The build unit may further include a powder dispenser which includes a powder reservoir or hopper. The hopper is filled with additive powder which is dispensed layer-by-layer during the AM process. Throughout a typical AM process, the hopper of the powder dispenser must be refilled many times.

Notably, there are frequently issues and inefficiencies that arise during the process of refilling the hopper. For example, conventional additive manufacturing machines may include a powder level sensor positioned within the hopper. However, the additive powder may be unevenly distributed within the hopper, resulting in faulty or inaccurate level detection. As a result, the powder supply system may provide too much or too little powder during a refill process, potentially resulting in wasted powder or longer refill downtimes. In addition, the powder supply source typically doses additive powder in an open loop manner, resulting in variations in the dispensed powder depending on, e.g., powder quality, volume, and ambient conditions.

Accordingly, an AM machine with a movable build unit and an improved system for refilling the powder dispenser would be useful. More particularly, a powder refill system that monitors the dosing of additive powder from the powder supply source and the levels of additive powder in the hopper to improve the dispensing of additive powder and general machine health would be particularly beneficial.

BRIEF DESCRIPTION

Aspects and advantages will be set forth in part in the following description, or may be obvious from the description, or may be learned through practice of the invention.

According to an exemplary embodiment of the present subject matter, an additive manufacturing machine defining a vertical direction is provided. The additive manufacturing machine includes a build unit including a powder dispenser including a hopper for receiving a volume of additive powder. A gantry movably supports the build unit within the additive manufacturing machine and a hopper sensing system is operably coupled to the build unit. The hopper sensing system includes a powder level sensor positioned for detecting a level of additive powder within the hopper.

According to another embodiment, an additive manufacturing machine is provided including a build unit having a powder dispenser including a hopper for receiving a volume of additive powder. A gantry movably supports the build unit within the additive manufacturing machine and a powder supply system including a conveyor extending between a powder supply source and the hopper for dispensing additive powder during a refill process. A hopper vision system maps the additive powder within the hopper and a refill vision system is positioned proximate the conveyor for detecting a powder quality of dispensed additive powder.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
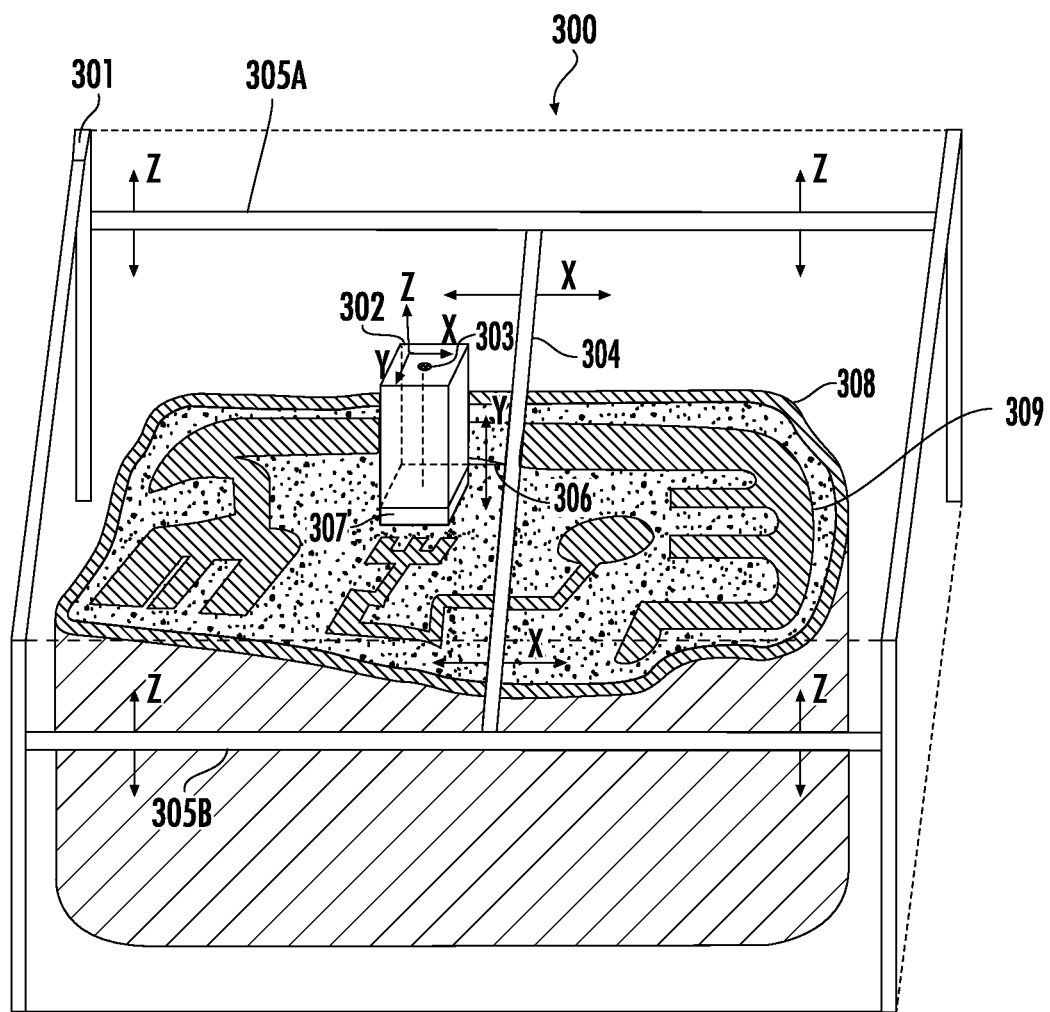
FIG. 1 shows a large scale additive manufacturing apparatus according to an embodiment of the invention.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components. In addition, the terms "upstream" and "downstream" refer to the relative direction with respect to fluid flow in a fluid pathway. For example, "upstream" refers to the direction from which the fluid flows, and "downstream" refers to the direction to which the fluid flows. Furthermore, as used herein, terms of approximation, such as "approximately," "substantially," or "about," refer to being within a ten percent margin of error.

An additive manufacturing machine is generally provided which includes a build unit including a powder dispenser having a hopper for receiving a volume of additive powder. A powder supply system includes a powder supply source and a conveyor for transporting dispensed additive powder to the hopper. A supply sensing system monitors the additive powder that is dispensed from the powder supply source and transported to the hopper and a hopper sensing system monitors the additive powder within the hopper. Each of these systems includes one or more powder level sensors, weight sensors, and/or vision systems for monitoring the additive powder.

FIG. 1 shows an example of one embodiment of a large-scale additive manufacturing apparatus 300 according to the present invention. The apparatus 300 comprises a positioning system 301, a build unit 302 comprising an irradiation emission directing device 303, a laminar gas flow zone 307, and a build plate (not shown in this view) beneath an object being built 309. The maximum build area is defined by the positioning system 301, instead of by a powder bed as with conventional systems, and the build area for a particular build can be confined to a build envelope 308 that may be dynamically built up along with the object. The gantry 301 has an x crossbeam 304 that moves the build unit 302 in the x direction. There are two z crossbeams 305A and 305B that move the build unit 302 and the x crossbeam 304 in the z direction. The x cross beam 304 and the build unit 302 are attached by a mechanism 306 that moves the build unit 302 in the y direction. In this illustration of one embodiment of the invention, the positioning system 301 is a gantry, but the present invention is not limited to using a gantry. In general, the positioning system used in the present invention may be any multidimensional positioning system such as a delta robot, cable robot, robot arm, etc. The irradiation emission directing device 303 may be independently moved inside of the build unit 302 by a second positioning system (not shown). The atmospheric environment outside the build unit, i.e. the "build environment," or "containment zone," is typically controlled such that the oxygen content is reduced relative to typical ambient air, and so that the environment is at reduced pressure.

There may also be an irradiation source that, in the case of a laser source, originates the photons comprising the laser beam irradiation is directed by the irradiation emission directing device. When the irradiation source is a laser source, then the irradiation emission directing device may be, for example, a galvo scanner, and the laser source may be located outside the build environment. Under these circumstances, the laser irradiation may be transported to the irradiation emission directing device by any suitable means, for example, a fiber-optic cable. According to an exemplary embodiment, irradiation emission directing device uses an optical control unit for directing the laser beam. An optical control unit may comprise, for example, optical lenses, deflectors, mirrors, and/or beam splitters. Advantageously, a telecentric lens may be used. When a large-scale additive manufacturing apparatus according to an embodiment of the present invention is in operation, if the irradiation emission directing devices directs a laser beam, then generally it is advantageous to include a gasflow device providing substantially laminar gas flow to a gasflow zone as illustrated in FIG. 1, 307 and FIG. 2, 404.

When the irradiation source is an electron source, then the electron source originates the electrons that comprise the e-beam that is directed by the irradiation emission directing device. An e-beam is a well-known source of irradiation. When the source is an electron source, then it is important to maintain sufficient vacuum in the space through which the e-beam passes. Therefore, for an e-beam, there is no gas flow across the gasflow zone (shown, for example at FIG. 1, 307). When the irradiation source is an electron source, then the irradiation emission directing device may be, for example, an electronic control unit which may comprise, for example, deflector coils, focusing coils, or similar elements.

The apparatus 300 allows for a maximum angle of the beam to be a relatively small angle $\Theta_2$ to build a large part, because (as illustrated in FIG. 1) the build unit 302 can be moved to a new location to build a new part of the object being formed 309. When the build unit is stationary, the point on the powder that the energy beam touches when $\Theta_2$ is 0 defines the center of a circle in the xy plane (the direction of the beam when $\Theta_2$ is approximately 0 defines the z direction), and the most distant point from the center of the circle where the energy beam touches the powder defines a point on the outer perimeter of the circle. This circle defines the beam's scan area, which may be smaller than the smallest cross sectional area of the object being formed (in the same plane as the beam's scan area). There is no particular upper limit on the size of the object relative to the beam's scan area.

In some embodiments, the recoater used is a selective recoater. One embodiment is illustrated in FIGS. 2 through 5.

Figure 2:
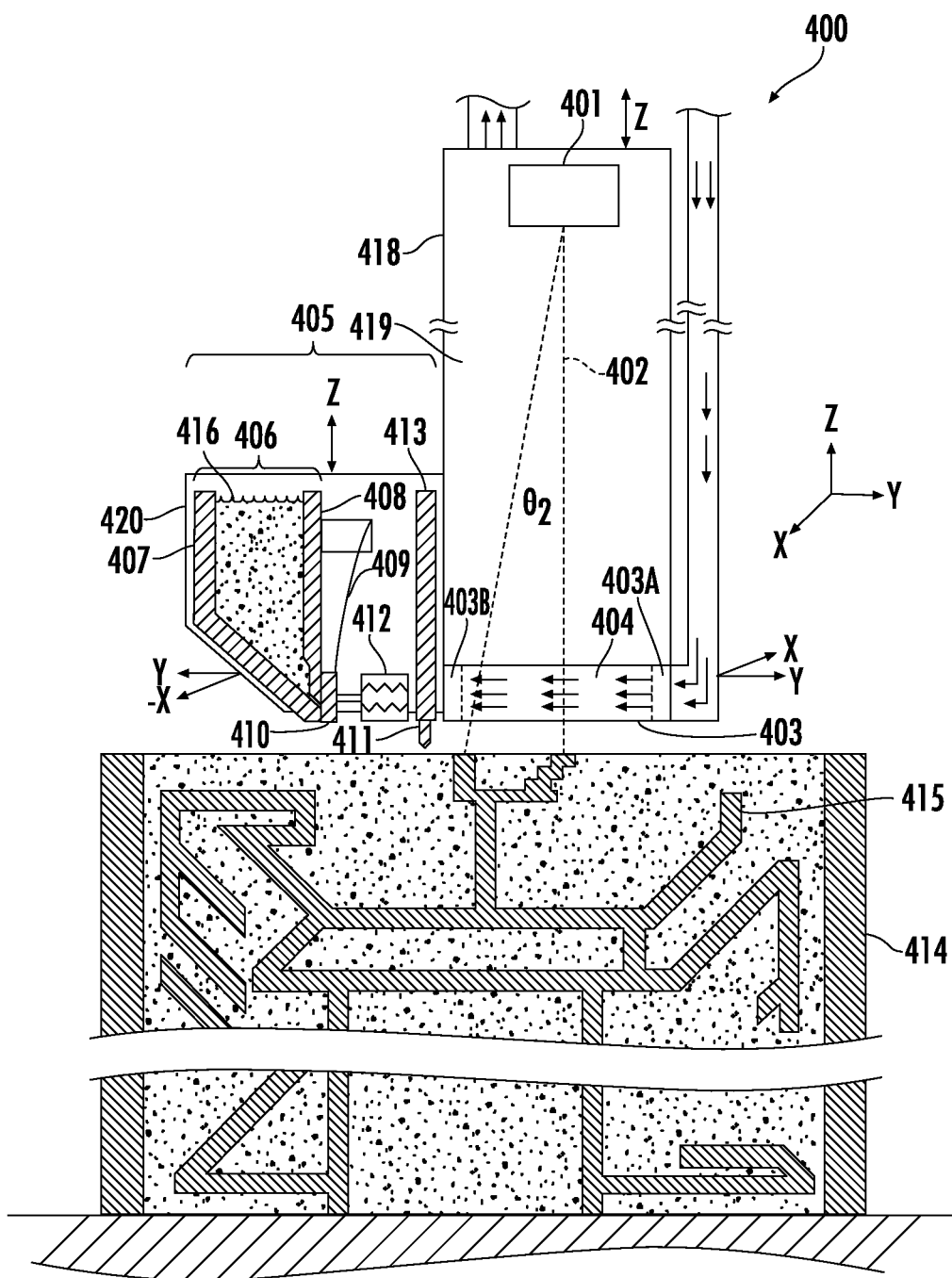
FIG. 2 shows a side view of a build unit according to an embodiment of the invention.

FIG. 2 shows a build unit 400 comprising an irradiation emission directing device 401, a gasflow device 403 with a pressurized outlet portion 403A and a vacuum inlet portion 403B providing gas flow to a gasflow zone 404, and a recoater 405. Above the gasflow zone 404 there is an enclosure 418 containing an inert environment 419. The recoater 405 has a hopper 406 comprising a back plate 407 and a front plate 408. The recoater 405 also has at least one actuating element 409, at least one gate plate 410, a recoater blade 411, an actuator 412, and a recoater arm 413. The recoater is mounted to a mounting plate 420. FIG. 2 also shows a build envelope 414 that may be built by, for example, additive manufacturing or Mig/Tig welding, an object being formed 415, and powder 416 contained in the hopper 405 used to form the object 415. In this particular embodiment, the actuator 412 activates the actuating element 409 to pull the gate plate 410 away from the front plate 408. In an embodiment, the actuator 412 may be, for example, a pneumatic actuator, and the actuating element 409 may be a bidirectional valve. In an embodiment, the actuator 412 may be, for example, a voice coil, and the actuating element 409 may be a spring. There is also a hopper gap 417 between the front plate 408 and the back plate 407 that allows powder to flow when a corresponding gate plate is pulled away from the powder gate by an actuating element. The powder 416, the back plate 407, the front plate 408, and the gate plate 410 may all be the same material. Alternatively, the back plate 407, the front plate 408, and the gate plate 410 may all be the same material, and that material may be one that is compatible with the powder material, such as cobalt-chrome. In this particular embodiment, the gas flow in the gasflow zone 404 flows in the y direction, but it does not have to. The recoater blade 411 has a width in the x direction. The direction of the irradiation emission beam when $\Theta_2$ is approximately 0 defines the z direction in this view. The gas flow in the gasflow zone 404 may be substantially laminar. The irradiation emission directing device 401 may be independently movable by a second positioning system (not shown). FIG. 2 shows the gate plate 410 in the closed position.

Figure 3:
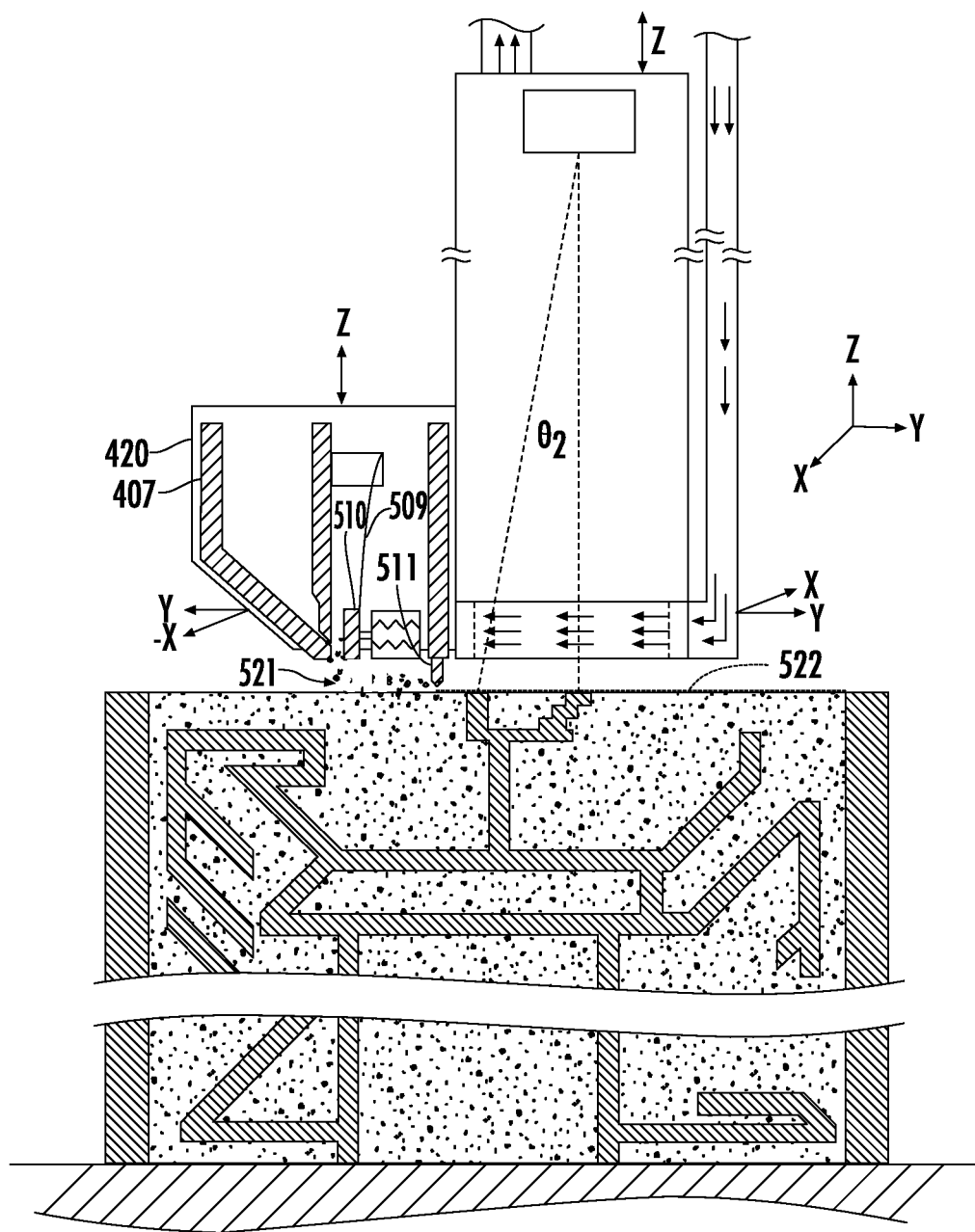
FIG. 3 shows a side view of a build unit dispensing powder according to an embodiment of the invention.

FIG. 3 shows the build unit of FIG. 2, with the gate plate 410 in the open position (as shown by element 510) and actuating element 509. Powder in the hopper is deposited to make fresh powder layer 521, which is smoothed over by the recoater blade 511 to make a substantially even powder layer 522. In some embodiments, the substantially even powder layer may be irradiated at the same time that the build unit is moving, which would allow for continuous operation of the build unit and thus faster production of the object.

Figure 4:
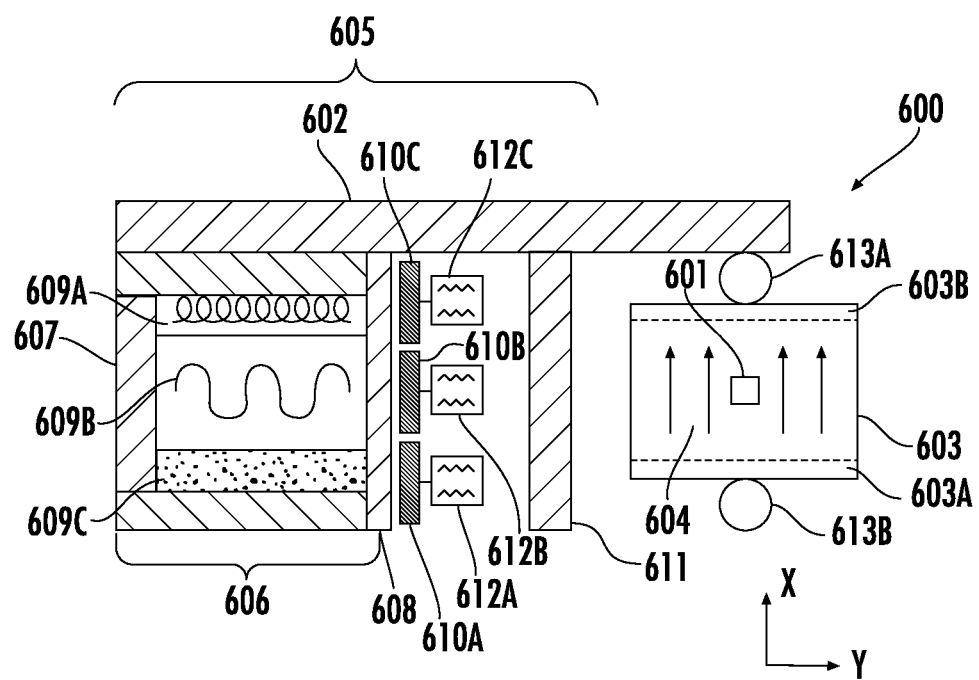
FIG. 4 shows a top view of a build unit according to an embodiment of the invention.

FIG. 4 shows a top down view of the build unit of FIG. 2. For simplicity, the object and the walls are not shown here. The build unit 600 has an irradiation emission directing device 601, an attachment plate 602 attached to the gasflow device 603, hopper 606, and recoater arm 611. The gasflow device has a gas outlet portion 603A and a gas inlet portion 603B. Within the gasflow device 603 there is a gasflow zone 604. The gasflow device 603 provides laminar gas flow within the gasflow zone 604. There is also a recoater 605 with a recoater arm 611, actuating elements 612A, 612B, and 612C, and gate plates 610A, 610B, and 610C. The recoater 605 also has a hopper 606 with a back plate 607 and front plate 608. In this particular illustration of one embodiment of the present invention, the hopper is divided into three separate compartments containing three different materials 609A, 609B, and 609C. There are also gas pipes 613A and 613B that feed gas out of and into the gasflow device 603.

Figure 5:
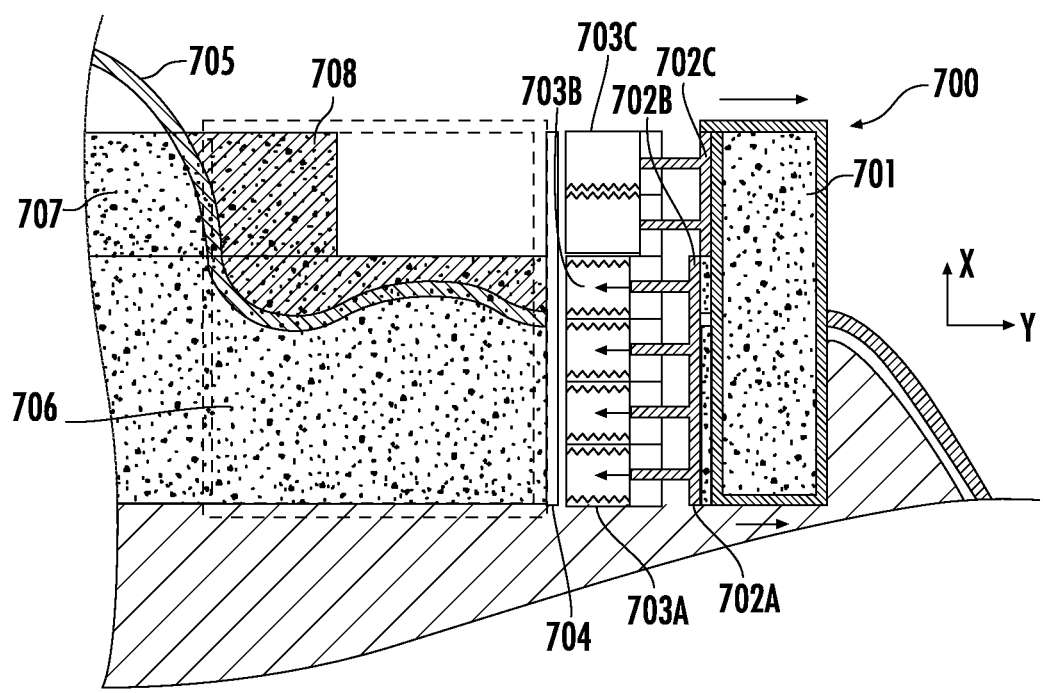
FIG. 5 shows a top view of a recoater according to an embodiment of the present invention.

FIG. 5 shows a top down view of a recoater according to one embodiment, where the recoater has a hopper 700 with only a single compartment containing a powder material 701. There are three gate plates 702A, 702B, and 702C that are controlled by three actuating elements 703A, 703B, and 703C. There is also a recoater arm 704 and a wall 705. When the recoater passes over a region that is within the wall, such as indicated by 707, the corresponding gate plate 702C may be held open to deposit powder in that region 707. When the recoater passes over a region that is outside of the wall, such as the region indicated as 708, the corresponding gate plate 702C is closed by its corresponding actuating element 703C, to avoid depositing powder outside the wall, which could potentially waste the powder. Within the wall 705, the recoater is able to deposit discrete lines of powder, such as indicated by 706. The recoater blade (not shown in this view) smooths out the powder deposited.

Advantageously, a selective recoater according to embodiments of the apparatus and methods described herein allows precise control of powder deposition using powder deposition device (e.g. a hopper) with independently controllable powder gates as illustrated, for example, in FIG. 4, 606, 610A, 610B, and 610C and FIG. 5, 702A, 702B, and 702C. The powder gates are controlled by at least one actuating element which may be, for instance, a bidirectional valve or a spring (as illustrated, for example, in FIG. 2, 409. Each powder gate can be opened and closed for particular periods of time, in particular patterns, to finely control the location and quantity of powder deposition (see, for example, FIG. 4). The hopper may contain dividing walls so that it comprises multiple chambers, each chamber corresponding to a powder gate, and each chamber containing a particular powder material (see, for example, FIG. 4, and 609A, 609B, and 609C). The powder materials in the separate chambers may be the same, or they may be different. Advantageously, each powder gate can be made relatively small so that control over the powder deposition is as fine as possible. Each powder gate has a width that may be, for example, no greater than about 2 inches, or more preferably no greater than about ¼ inch. In general, the smaller the powder gate, the greater the powder deposition resolution, and there is no particular lower limit on the width of the powder gate. The sum of the widths of all powder gates may be smaller than the largest width of the object, and there is no particular upper limit on the width of the object relative to the sum of the widths of the power gates. Advantageously, a simple on/off powder gate mechanism according to one embodiment is simpler and thus less prone to malfunctioning. It also advantageously permits the powder to come into contact with fewer parts, which reduces the possibility of contamination. Advantageously, a recoater according to an embodiment of the present invention can be used to build a much larger object. For example, the largest xy cross sectional area of the recoater may be smaller than the smallest cross sectional area of the object, and there is no particular upper limit on the size of the object relative to the recoater. Likewise, the width of the recoater blade may smaller than the smallest width of the object, and there is no particular upper limit on the width of the object relative to the recoater blade. After the powder is deposited, a recoater blade can be passed over the powder to create a substantially even layer of powder with a particular thickness, for example about 50 microns, or preferably about 30 microns, or still more preferably about 20 microns. Another feature of some embodiments of the present invention is a force feedback loop. There can be a sensor on the selective recoater that detects the force on the recoater blade. During the manufacturing process, if there is a time when the expected force on the blade does not substantially match the detected force, then control over the powder gates may be modified to compensate for the difference. For instance, if a thick layer of powder is to be provided, but the blade experiences a relatively low force, this scenario may indicate that the powder gates are clogged and thus dispensing powder at a lower rate than normal. Under these circumstances, the powder gates can be opened for a longer period of time to deposit sufficient powder. On the other hand, if the blade experiences a relatively high force, but the layer of powder provided is relatively thin, this may indicate that the powder gates are not being closed properly, even when the actuators are supposed to close them. Under these circumstances, it may be advantageous to pause the build cycle so that the system can be diagnosed and repaired, so that the build may be continued without comprising part quality. Another feature of some embodiments of the present invention is a camera for monitoring the powder layer thickness. Based on the powder layer thickness, the powder gates can be controlled to add more or less powder.

In addition, an apparatus according to an embodiment of the present invention may have a controlled low oxygen build environment with two or more gas zones to facilitate a low oxygen environment. The first gas zone is positioned immediately over the work surface. The second gas zone may be positioned above the first gas zone, and may be isolated from the larger build environment by an enclosure. For example, in FIG. 2 element 404 constitutes the first gas zone, element 419 constitutes the second gas zone contained by the enclosure 418, and the environment around the entire apparatus is the controlled low oxygen build environment. In the embodiment illustrated in FIG. 2, the first gasflow zone 404 is essentially the inner volume of the gasflow device 403, i.e. the volume defined by the vertical (xz plane) surfaces of the inlet and outlet portions (403A and 403B), and by extending imaginary surfaces from the respective upper and lower edges of the inlet portion to the upper and lower edges of the outlet portion in the xy plane. When the irradiation emission directing device directs a laser beam, then the gasflow device preferably provides substantially laminar gas flow across the first gas zone. This facilitates removal of the effluent plume caused by laser melting. Accordingly, when a layer of powder is irradiated, smoke, condensates, and other impurities flow into the first gasflow zone, and are transferred away from the powder and the object being formed by the laminar gas flow. The smoke, condensates, and other impurities flow into the low-pressure gas outlet portion and are eventually collected in a filter, such as a HEPA filter. By maintaining laminar flow, the aforementioned smoke, condensates and other impurities can be efficiently removed while also rapidly cooling melt pool(s) created by the laser, without disturbing the powder layer, resulting in higher quality parts with improved metallurgical characteristics. In an aspect, the gas flow in the gasflow volume is at about 3 meters per second. The gas may flow in either the x or y direction.

The oxygen content of the second controlled atmospheric environment is generally approximately equal to the oxygen content of the first controlled atmospheric environment, although it doesn't have to be. The oxygen content of both controlled atmospheric environments is preferably relatively low. For example, it may be 1% or less, or more preferably 0.5% or less, or still more preferably 0.1% or less. The non-oxygen gases may be any suitable gas for the process. For instance, nitrogen obtained by separating ambient air may be a convenient option for some applications. Some applications may use other gases such as helium, neon, or argon. An advantage of the invention is that it is much easier to maintain a low-oxygen environment in the relatively small volume of the first and second controlled atmospheric environments. In prior art systems and methods, the larger environment around the entire apparatus and object must be tightly controlled to have a relatively low oxygen content, for instance 1% or less. This can be time-consuming, expensive, and technically difficult. Thus it is preferable that only relatively smaller volumes require such relatively tight atmospheric control. Therefore, in the present invention, the first and second controlled atmospheric environments may be, for example, 100 times smaller in terms of volume than the build environment. The first gas zone, and likewise the gasflow device, may have a largest xy cross sectional area that is smaller than the smallest cross sectional area of the object. There is no particular upper limit on the size of the object relative to the first gas zone and/or the gasflow device. Advantageously, the irradiation emission beam (illustrated, for example, as 402 and 502) fires through the first and second gas zones, which are relatively low oxygen zones. And when the first gas zone is a laminar gasflow zone with substantially laminar gas flow, the irradiation emission beam is a laser beam with a more clear line of sight to the object, due to the aforementioned efficient removal of smoke, condensates, and other contaminants or impurities.

One advantage of the present invention is that, in some embodiments, the build plate may be vertically stationary (i.e. in the z direction). This permits the build plate to support as much material as necessary, unlike the prior art methods and systems, which require some mechanism to raise and lower the build plate, thus limiting the amount of material that can be used. Accordingly, the apparatus of the present invention is particularly suited for manufacturing an object within a large (e.g., greater than 1 m$^3$) build envelope. For instance, the build envelope may have a smallest xy cross sectional area greater than 500 mm$^2$, or preferably greater than 750 mm$^2$, or more preferably greater than 1 m$^2$. The size of the build envelope is not particularly limited. For instance, it could have a smallest cross sectional area as large as 100 m$^2$. Likewise, the formed object may have a largest xy cross sectional area that is no less than about 500 mm$^2$, or preferably no less than about 750 mm$^2$, or still more preferably no less than about 1 m$^2$. There is no particular upper limit on the size of the object. For example, the object's smallest xy cross sectional area may be as large as 100 m$^2$. Because the build envelope retains unfused powder about the object, it can be made in a way that minimizes unfused powder (which can potentially be wasted powder) within a particular build, which is particularly advantageous for large builds. When building large objects within a dynamically grown build envelope, it may be advantageous to build the envelope using a different build unit, or even a different build method altogether, than is used for the object. For example, it may be advantageous to have one build unit that directs an e-beam, and another build unit that directs a laser beam. With respect to the build envelope, precision and quality of the envelope may be relatively unimportant, such that rapid build techniques are advantageously used. In general, the build envelope may be built by any suitable means, for instance by Mig or Tig welding, or by laser powder deposition. If the wall is built by additive manufacturing, then a different irradiation emission directing device can be used to build than wall than is used to build the object. This is advantageous because building the wall may be done more quickly with a particular irradiation emission directing device and method, whereas a slower and more accurate directing device and method may be desired to build the object. For example, the wall may be built from a rapidly built using a different material from the object, which may require a different build method. Ways to tune accuracy vs. speed of a build are well known in the art, and are not recited here.

Figure 6:
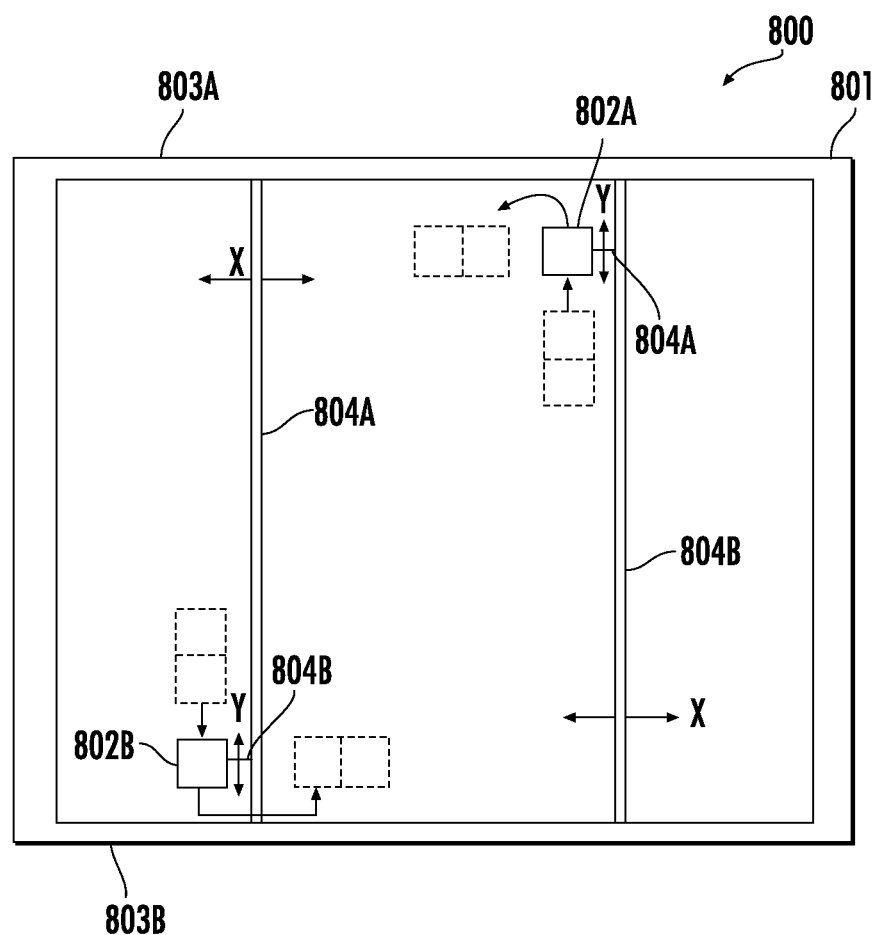
FIG. 6 illustrates a large scale additive manufacturing apparatus with two build units according to an embodiment of the present invention.

For example, as shown in FIG. 6, the systems and methods of the present invention may use two or more build units to build one or more object(s). The number of build units, objects, and their respective sizes are only limited by the physical spatial configuration of the apparatus. FIG. 6 shows a top down view of a large-scale additive manufacturing machine 800 according to an embodiment of the invention. There are two build units 802A and 802B mounted to a positioning system 801. There are z crossbeams 803A and 803B for moving the build units in the z direction. There are x crossbeams 804A and 804B for moving the build units in the x direction. The build units 802A and 802B are attached to the x crossbeams 804A and 804B by mechanisms 805A and 805B that move the units in the y direction. The object(s) being formed are not shown in this view. A build envelope (also not shown in this view) can be built using one or both of the build units, including by laser powder deposition. The build envelope could also be built by, e.g., welding. In general, any number of objects and build envelopes can be built simultaneously using the methods and systems of the present invention.

Figure 7:
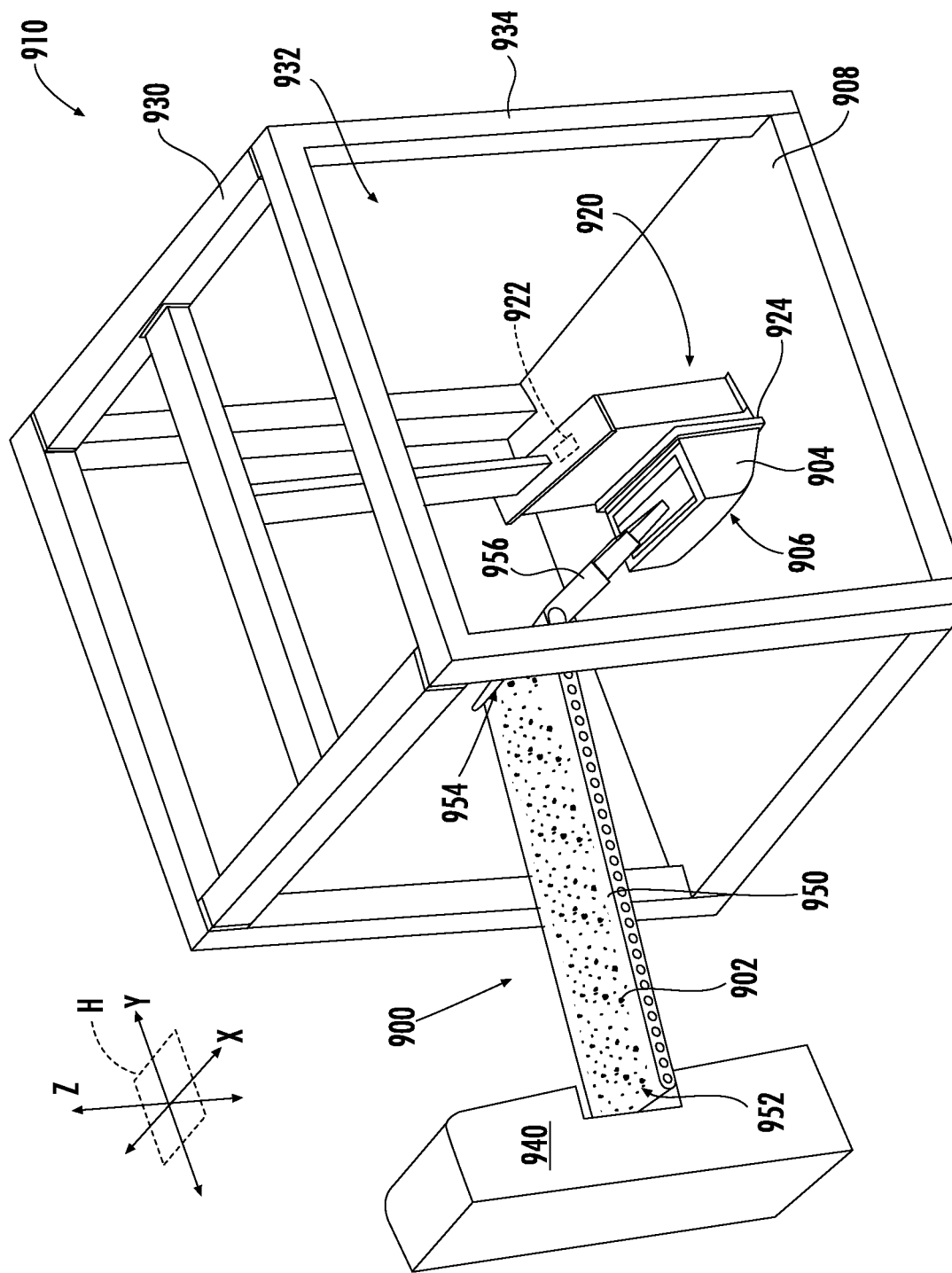
FIG. 7 illustrates a perspective view of a powder supply system according to an embodiment of the present invention.

Referring now to FIG. 7, a powder supply system 900 for providing additive powder 902 to hopper 904 of a powder dispenser 906 will be described according to an exemplary embodiment. As used herein, "additive powder" may be used to refer to any material deposited onto a build plate or build platform 908 of the additive manufacturing machine 910 or on top of a base layer or prior additively formed layer of powder that may be fused or bonded by an energy beam of an energy source such an irradiation emission directing device. The additive powder 902 may be any material suitable for fusing to form a part during the additive manufacturing process. Examples of such material include engineering plastics, thermoplastic elastomers, metals, and ceramics. However, it should be appreciated that other materials could be used according to alternative embodiments.

As illustrated in FIG. 7, additive manufacturing machine 910 defines a vertical direction (i.e., the Z-direction) and a horizontal plane H (e.g., defined by the X-direction and the Y-direction). Build platform 908 extends within the horizontal plane H to provide a surface for depositing layers of additive powder 902, as described herein. In general, additive manufacturing machine 910 includes a build unit 920 that is generally used for depositing a layer of additive powder 902 and fusing portions of the layer of additive powder 902 to form a single layer of a component (not illustrated in FIG. 7). As described above, build unit 920 forms the component layer-by-layer by printing or fusing layers of additive powder 902 as build unit 920 moves up along the vertical direction.

Build unit 920 generally includes a powder dispenser 906 for discharging a layer of additive powder 902 and an energy source 922 for selectively directing energy toward the layer of additive powder 902 to fuse portions of the layer of additive powder 902. For example, powder dispenser 906 may include a powder hopper 904, a system of gates (see, e.g., FIG. 4, 610A-C and FIG. 5, 702A-C), a recoater arm 924, and any other components which facilitate the deposition of smooth layers of additive powder 902 on build platform 908 or a sub layer. In addition, "energy source" may be used to refer to any device or system of devices configured for directing an energy beam towards a layer of additive powder 902 to fuse a portion of that layer of additive powder 902. For example, according to an exemplary embodiment, energy source 922 may be an irradiation emission directing device as described above.

As described above, build unit 920 is described as utilizing a direct metal laser sintering (DMLS) or direct metal laser melting (DMLM) process using an energy source to selectively sinter or melt portions of a layer of powder. However, it should be appreciated that according to alternative embodiments, additive manufacturing machine 910 and build unit 920 may be configured for using a "binder jetting" process of additive manufacturing. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. For example, the liquid binding agent may be a photo-curable polymer or another liquid bonding agent. Other suitable additive manufacturing methods and variants are intended to be within the scope of the present subject matter.

Notably, according aspects of the present subject matter, build unit 920 is supported by a gantry 930 that is positioned above build platform 908 and at least partially defines a build area 932. Notably, as used herein, "gantry" 930 is intended to refer to the horizontally extending support beams and not the vertical support legs 934 that support the gantry 930 over the build platform 908. Although a gantry 930 is used to describe the support for build unit 920 herein, it should be appreciated that any suitable vertical support means can be used according to alternative embodiments. For example, build unit 920 may be attached to a positioning system such as a delta robot, a cable robot, a robot arm, a belt drive, etc. In addition, although build platform 908 is illustrated herein as being stationary, it should be appreciated that build platform 908 may move according to alternative embodiments. In this regard, for example, build platform 908 may be configured for translating along the X-Y-Z directions or may rotate about one of these axes.

According to the illustrated embodiment, gantry 930 defines a build area 932 having a maximum build width (e.g., measured along the X-direction), build depth (e.g., measured along the Y-direction), and build height (measured along the vertical direction or Z-direction). Gantry 930 is generally configured for movably supporting build unit 920 within build area 932, e.g., such that build unit 920 may be positioned at any location (e.g., along X-Y-Z axes) within build area 932. Moreover, according to exemplary embodiments, gantry 930 may further be configured for rotating build unit about the X, Y, and Z axes. Thus, build unit 920 may be positioned and oriented in any suitable manner within build area 932 to perform additive manufacturing process.

Notably, as described briefly above, powder dispenser 906 is capable of holding a limited volume of additive powder 902. Thus, powder hopper 904 must be frequently refilled during the additive manufacturing process so that the powder dispenser 906 may continue to deposit layers of additive powder 902. Powder supply system 900, as described herein, is generally configured for refilling hopper 904 of powder dispenser 906.

In general, as best illustrated in FIG. 7, additive manufacturing machine 910 includes a powder supply source 940 which is positioned external to gantry 930 or outside of build area 932 and is generally configured for continuously supplying additive powder 902 to powder dispenser 906. More specifically, powder supply source 940 is generally sufficient for supplying all additive powder 902 necessary to complete a build process, which may fill the entire build area 932. In this manner, operators of the additive manufacturing machine 910 may make sure that powder supply source 940 always has additive powder 902 ready and available for powder dispenser 906 in the event it needs a refill.

Powder supply system 900 generally includes any suitable number and type of apparatus, devices, or systems of components configured for transporting or conveying additive powder 902 from powder supply source 940 to powder dispenser 906, e.g., directly into powder hopper 904. According to the exemplary embodiment, powder supply system 900 is positioned below gantry 930 along the vertical or Z-direction and extends substantially within the horizontal plane H between powder supply source 940 and powder dispenser 906.

More specifically, according to the illustrated embodiment, powder supply system 900 includes a conveyor 950 that transports additive powder 902 from powder supply source 940 to powder dispenser 906. For example, conveyor 950 may be a simple belt conveyor, bucket conveyor, or any other suitable transport for additive powder 902 to powder dispenser 906. According to still another embodiment, conveyor 950 is a vibrating belt conveyor which may vibrate to facilitate the movement of the additive powder 902. Powder supply system 900 and conveyor 950 may include any suitable features for retaining and transporting additive powder between powder supply source 940 and build unit 920. For example, conveyor 950 may include raised sides which prevent additive powder 902 from falling under the force of gravity. Alternatively, supply system may be a series of buckets or containers that move between powder supply source 940 and hopper 904. According still another embodiment, powder supply system 900 may include a closed tube or conduit that urges additive powder 902 from powder supply source 940 to hopper 904, e.g., under the force of gravity, via a screw drive mechanism, a pump mechanism, or any other suitable means.

Powder supply system 900 can extend from an intake 952 proximate powder supply source 940 to a discharge 954 proximate powder hopper 904. Intake 952 may be any device or apparatus for depositing additive powder 902 onto conveyor 950. Similarly, discharge 954 may be any suitable device or apparatus used to deposit, drop, or otherwise move additive powder 902 from conveyor 950 to powder hopper 904. Thus, for example, powder supply source 940 may be periodically supplied additive powder 902 and may include a vertical drive screw or other mechanism for depositing the additive powder onto intake 952 of conveyor 950. Conveyor 950 may then transport the additive powder 902 from outside of build area 932 into build area 932 in toward build unit 920. Similarly, discharge 954 may include a telescoping chute 956 or some other dispensing mechanism for directing the additive powder 902 from conveyor 950 and into powder hopper 904. According to another embodiment, powder supply source 950 may be manually supplied with additive powder 902, e.g., by an operator of additive manufacturing machine 910. Alternatively, the operator may deposit additive powder 902 directly onto conveyor 950 or into a device which continuously feeds conveyor 950 when hopper 904 needs to be refilled. Conveyor 950 may operate continuously, or when additive powders 902 are detected on conveyor 950, to transport additive powder 902 from powder supply source 940 to build unit 920.

Figure 8:
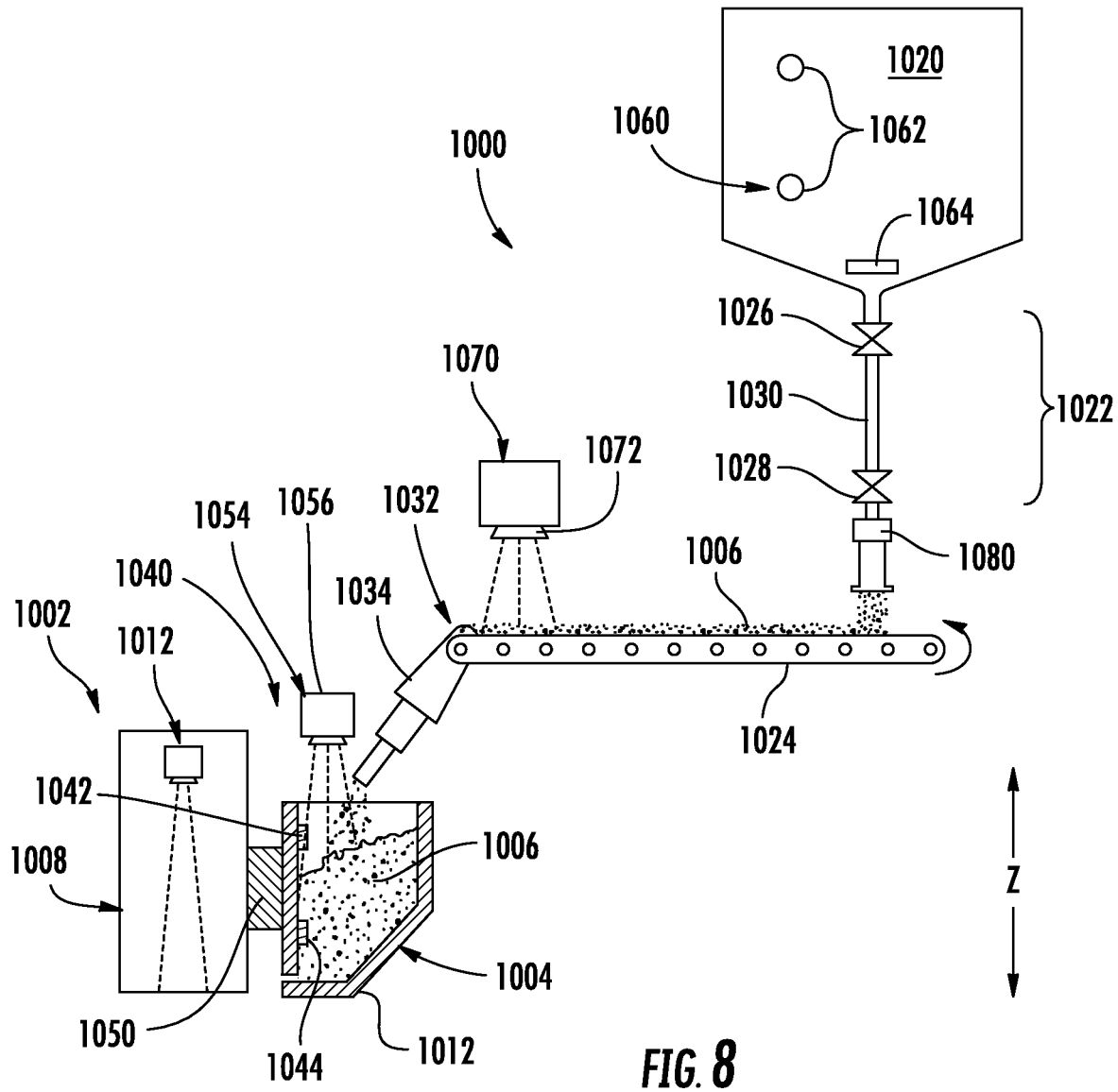
FIG. 8 illustrates a schematic view of a powder supply system according to an embodiment of the present invention.

Referring now to FIG. 8, a powder supply system 1000 and refill sensing systems (such as a hopper sensing system and supply sensing system described below) will be described according to exemplary embodiments of the present subject matter. Powder supply system 1000 may be generally used to the refill a powder dispenser in an additive manufacturing machine. For example, according to the illustrated embodiment, powder supply system 1000 is configured for refilling a build unit 1002 of an additive manufacturing machine. For example, build unit may be the same or similar to build unit 920 of additive manufacturing machine 910. However, powder supply system 1000 can also be used for supplying additive powder to any other suitable additive manufacturing machine.

Build unit 1002 may generally include a powder dispenser 1004 for depositing layers of additive powder 1006 and a scan unit 1008 for selectively fusing or binding portions of the deposited layers to form a component. More specifically, for example, powder dispenser 1004 may include a hopper 1010 for storing additive powder 1006 and scan unit 1008 may include a powder fusing device 1012 (e.g., such as energy source 922) for melting, sintering, or otherwise binding the additive powder 1006 to form a component layer-by-layer.

Referring still to FIG. 8, powder supply system 1000 generally includes a powder supply source 1020, such as a reservoir of additive powder 1006. Powder supply source 1020 is generally configured for providing additive powder 1006 to the hopper of an additive manufacturing machine. For example, as illustrated in FIG. 8, powder supply source 1020 is operably coupled to a valve system 1022 that includes multiple dosing valves for selectively providing a precise amount of additive powder 1006 onto a conveyor 1024. More specifically, an upper dosing valve 1026 is coupled to a lower dosing valve 1028 through a dosing conduit 1030. The size and length of dosing conduit 1030 may be selected to contain a desired volume of additive powder 1006. In this manner, for example, during a refill operation, lower dosing valve 1028 may be closed while upper dosing valve 1026 is opened to fill dosing conduit 1030 with a desired amount of additive powder 1006. Upper dosing valve 1026 may then be closed before lower dosing valve 1028 is opened to dispense the volume of additive powder 1006 onto conveyor 1024, which may be configured for transporting the additive powder 1006 dispensed from the powder supply source 1020 to hopper 1010. It should be appreciated that any other suitable valve system or dispensing mechanism may be used for selectively dispensing additive powder 1006 according to an alternative embodiment.

Conveyor 1014 may comprise a discharge 1032 proximate hopper 1010. For example, according to the illustrated embodiment, discharge 1032 is positioned above hopper 1010 along the vertical direction V. In this manner, additive powder 1006 may fall off of the end of conveyor 1024 under the force of gravity into hopper 1010. In addition, discharge 1032 may include any suitable device or apparatus used to deposit, drop, or otherwise move additive powder 1006 from conveyor 1024 to hopper 1010. Thus, for example, discharge 1032 may include a chute 1034 or some other dispensing mechanism for directing the additive powder 1006 from conveyor 1024 and into hopper 1010.

Notably, the refill process of an additive manufacturing machine is typically an open-ended process whereby the powder supply source dispenses a fixed amount of additive powder regardless of the actual level of additive powder in the hopper. This method of dispensing additive powder may result in under filling or overfilling the hopper, thus wasting large amounts of additive powder or being generally inefficient. Complex powder containment and recirculation systems for misdirected additive powder may be required to reduce material costs, prevent buildup of additive powder on sensitive components, and avoid other serious operational issues.

According to an exemplary embodiment the present subject matter, the hopper 1010 is coupled to scan unit 1008 which moves throughout a build area of the additive manufacturing machine. Thus, build unit 1002 may be configured for moving hopper 1010 to a refill station where powder supply system 1000 is located. According to such an embodiment, powder supply system 1000 and powder supply source 1020 are all fixed within the additive manufacturing machine, e.g., relative to a gantry. However, it should be appreciated that according to alternative embodiments, these systems may be mobile such that some or all of them may move toward the build unit, e.g., into the build area, when hopper 1010 needs to be refilled. More specifically, according such embodiment, conveyor 1024 may extend out to or otherwise move with hopper 1010 during a refill process. Other configurations are possible and within scope of the present subject matter.

Referring still to FIG. 8, an additive manufacturing machine may further include a hopper sensing system 1040 that is generally configured for monitoring additive powder 1006 that is contained within or otherwise being deposited into hopper 1010. In this regard, for example, hopper sensing system 1040 may include any suitable number and type of sensors or devices for monitoring the level, distribution, weight, or quality characteristics of additive powder 1006 in hopper 1010. In addition, hopper sensing system 1040 may monitor a flow rate of additive powder 1006 into or out of hopper 1010 or any other suitable powder characteristic. According to an exemplary embodiment, some or all of the sensors may be fixed relative to hopper 1010, e.g., such as by attachment to build unit 1002 or by mounting to a gantry or other component of the additive manufacturing machine.

In general, hopper sensing system 1040 may include one or more powder level sensors which are generally configured for measuring additive powder 1006 within hopper 1010. As illustrated in FIG. 8, hopper sensing system 1040 includes an upper powder level sensor 1042 positioned proximate a top of hopper 1010 and a lower powder level sensor 1044 positioned proximate a bottom of hopper 1010. More specifically, for example, upper powder level sensor 1042 may be positioned proximate a maximum fill line to prevent spillage of additive powder 1006 and lower powder level sensor 1044 may be positioned proximate a low fill line to indicate that the hopper 1010 needs to be refilled with additive powder 1006. Powder level sensors 1042, 1044 may be any suitable sensor or system of sensors for determining a level of additive powder 1006 within hopper 1010, such as proximity sensors, laser distance detectors, optical sensors, electrical conductivity sensors, etc. In addition, it should be appreciated that although two powder level sensors are illustrated, any suitable number, type, and configuration of sensors may be used according to alternative embodiments.

Moreover, although powder level sensors 1042, 1044 are described herein as being positioned in or on hopper 1010, it should be appreciated that these sensors may instead be located remotely or otherwise operably coupled with hopper 1010 (in the sense that they can detect powder levels within hopper 1010) while remaining within the scope of the present subject matter. For example, powder level sensors 1042, 1044 may be positioned outside of hopper 1010 and may detect powder levels through a transparent glass portion of hopper 1010 or may be positioned above hopper 1010 for detecting powder levels. The exemplary embodiments described herein are not intended to limit the number, type, and position of powder level sensors.

Notably, relying solely on the powder level sensors to determine the amount of additive powder within a hopper may result in inaccuracies due to the distribution of additive powder within the hopper. For example, in certain conditions, additive powder 1006 may have a tendency to cling to the walls of hopper 1010. Therefore, a powder sensor that is located on a wall of hopper 1010 may measure the powder level as being higher than an actual level because it does not detect the variation in powder level throughout hopper 1010. In addition, the use of fewer than all powder dispensing gates within powder dispenser 1004 and/or the depositing of additive powder 1006 in a center or single location within hopper 1010 during a refill process may result in localized variation in the level of additive powder 1006 relative to a horizontal plane.

Therefore, according to an exemplary embodiment, hopper sensing system 1040 may further include a weight sensor 1050 that is operably coupled to hopper 1010 and is configured for measuring the weight of additive powder 1006 within hopper 1010. In this regard, for example, hopper 1010 and/or powder dispenser 1004 may be supported from scan unit 1008 by weight sensor 1050, e.g., such that weight sensor 1050 is positioned between scan unit 1008 and powder dispenser 1004. In this manner, weight sensor 1050 may continuously monitor the weight of hopper 1010 and the amount of additive powder 1006 in hopper 1010 may be calculated. Notably, using both powder level sensors 1042, 1044 and weight sensor 1050, a more accurate prediction of the amount of additive powder 1006 within the hopper 1010 may be determined. More specifically, for example, if a powder level sensor indicates that hopper 1010 is close to empty and needs to be refilled, but the weight sensor indicates that there is sufficient additive powder left for further operation, a controller may be used to make a determination as to when refill operation is needed and the amount of additive powder 1006 that must be refilled.

Referring still to FIG. 8, hopper sensing system 1040 may further include a hopper vision system 1054 for mapping additive powder 1006 within hopper 1010. As used herein, "mapping" may refer to the generation of any representation of additive powder 1006 within hopper 1010 that may be used to facilitate improved refill operation, component health monitoring, or machine operation. For example, hopper vision system 1054 may generate an image or a visual representation of the topology of additive powder 1006 in a two-dimensional plane within hopper 1010. Hopper vision system 1054 may, for example, include a camera system 1056, a proximity sensing system, an optical sensing system, a laser distance measuring system, or any other suitable system for generating a representation of the amount and distribution of additive powder 1006 within a two-dimensional space. In addition, according to alternative embodiments, hopper vision system 1054 may be used to detect and map localized density variations within a volume of additive powder 1006 within hopper 1010.

According to one embodiment, hopper vision system 1054 may be fixed relative to hopper 1010, e.g., by direct attachment to hopper 1010, build unit 1002, or a supporting gantry. By contrast, according to alternative embodiments, hopper vision system 154 may be attached to gantry 930. In such an embodiment, hopper vision system 1054 may be configured for mapping additive powder 1006 within hopper 1010 during a refill process. According to still other embodiments, hopper vision system 1054 or any of its components may be positioned at any suitable location permitting a visual inspection of additive powder 1006 within hopper 1010.

As described above, hopper sensing system 1040 includes one or more powder level sensors, weight sensors, and/or vision systems for generating an accurate representation of the amount of additive powder 1006 within hopper 1010. As a result, the amount of additive powder 1006 used during the manufacturing process could be greatly reduced and the health of the machine and/or manufacturing processes may be determined. For example, regarding machine and process health, the correct rate of powder usage for a normal build could be compared to the actual usage. If an unexpected change in usage is detected, such a change can be used to identify failure modes before they occur. In addition, by obtaining an accurate representation of the amount of additive powder 1006 and its distribution within hopper 1010, the additive manufacturing machine can predict low dosing events, can detect the presence of clogged powder or contaminants, and can provide an assessment of the health of each gate of powder dispenser 1004.

Referring still to FIG. 8, the additive manufacturing machine may further include a supply sensing system 1060 that is generally configured for monitoring the refill operation of hopper 1010. Similar to hopper sensing system 1040, supply sensing system 1060 may include one or more powder level sensors 1062 and/or weight sensors 1064 for detecting or determining the level and weight of additive powder 1006 within powder supply source 1020. Notably, powder level sensors 1062 and weight sensors 1064 may be used in a manner similar to hopper sensing system 1040, but are operably coupled to powder supply source 1020. In this manner, the sensors may determine the amount and distribution of additive powder 1006 within powder supply source 1020.

In addition, supply sensing system 1016 may further include a refill vision system 1070 positioned proximate discharge 1032 of conveyor 1024 for detecting a powder level, powder distribution, or a powder quality or property characteristic of the dispensed additive powder 1006. Refill vision system 1070 may operate similar to hopper vision system 1054. In this regard, refill vision system 1070 may generate an image or a visual representation of the topology of additive powder 1006 in a two-dimensional plane on top of conveyor 1024. Refill vision system 1070 may, for example, include a camera system 1072, a proximity sensing system, an optical sensing system, a laser distance measuring system, or any other suitable system for generating a representation of the amount and distribution of additive powder 1006. According to one embodiment, refill vision system 1070 may be fixed relative to conveyor 1024, e.g., by direct attachment to conveyor 1024, powder supply source 1020, or a supporting gantry.

Supply sensing system 1016 may further include one or more powder quality sensors for measuring at least one powder quality characteristic of the dispensed additive powder 1006. For example, according to the illustrated embodiment, a powder quality sensor 1080 is positioned at an outlet of powder supply source 1020, e.g., downstream of lower dosing valve 1028. In this manner, powder quality sensor 1080 may measure powder quality characteristics of additive powder 1006 as it is dispensed. According to an exemplary embodiment, the powder quality characteristic is selected from a powder humidity, a powder mass, a powder density, or a powder purity/contaminant level. More generally, as used herein, "powder properties" or "powder quality characteristics" may be used to refer to any characteristic of additive powder 1006 or the dispensing process of the additive powder 1006 which may affect the flow of additive powder 1006, the presence, level, or distribution of contaminants within additive powder 1006, the quality of additive powder 1006 deposited for subsequent fusion, or characteristics of additive powder 1006 which may otherwise affect the additive manufacturing process. The additive manufacturing machine may use information regarding those powder quality characteristics to improve the performance of powder supply system 1000 and the operation of the additive manufacturing machine.

Although the illustrated embodiment shows powder quality sensor 1080 positioned at an outlet of powder supply source 1020 for detecting a powder quality characteristic of dispensed additive powder, it should be appreciated that the same or similar sensors may be used throughout the additive manufacturing machine for detecting powder quality. For example, powder quality sensor 1080 may instead be positioned proximate conveyor 1024 for detecting the quality of additive powder 1006 during transport. Alternatively, hopper sensing system 1040 could include powder quality sensor 1080 for detecting the quality of additive powder 1006 dispensed into hopper 1010. Any suitable number, type, position, and configuration of powder quality sensors may be used according to alternative embodiments.

Figure 9:
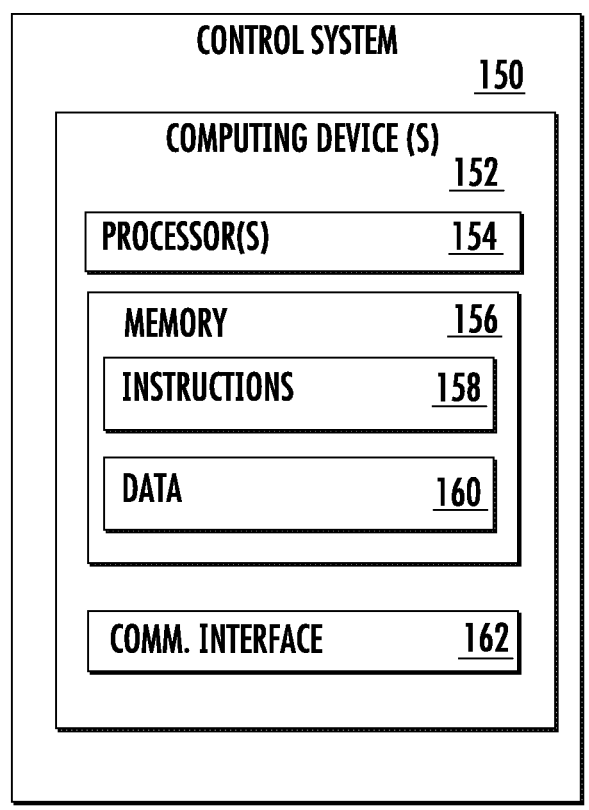
FIG. 9 shows an exemplary control system for use with an additive manufacturing machine and a powder supply system according to an embodiment of the invention.

FIG. 9 depicts a block diagram of an example control system 150 that can be used to implement methods and systems according to example embodiments of the present disclosure, particularly the operation of powder supply system 1000 and/or refill sensing systems. As shown, the control system 150 can include one or more computing device(s) 152. The one or more computing device(s) 152 can include one or more processor(s) 154 and one or more memory device(s) 156. The one or more processor(s) 154 can include any suitable processing device, such as a microprocessor, microcontroller, integrated circuit, logic device, or other suitable processing device. The one or more memory device(s) 156 can include one or more computer-readable media, including, but not limited to, non-transitory computer-readable media, RAM, ROM, hard drives, flash drives, or other memory devices.

The one or more memory device(s) 156 can store information accessible by the one or more processor(s) 154, including computer-readable instructions 158 that can be executed by the one or more processor(s) 154. The instructions 158 can be any set of instructions that when executed by the one or more processor(s) 154, cause the one or more processor(s) 154 to perform operations. The instructions 158 can be software written in any suitable programming language or can be implemented in hardware. In some embodiments, the instructions 158 can be executed by the one or more processor(s) 154 to cause the one or more processor(s) 154 to perform operations, such as the operations for controlling the operating of powder supply system or additive manufacturing device.

The memory device(s) 156 can further store data 160 that can be accessed by the one or more processor(s) 154. For example, the data 160 can include any data used for operating powder supply system and/or additive manufacturing machine, as described herein. The data 160 can include one or more table(s), function(s), algorithm(s), model(s), equation(s), etc. for operating powder supply system and/or additive manufacturing machine according to example embodiments of the present disclosure.

The one or more computing device(s) 152 can also include a communication interface 162 used to communicate, for example, with the other components of system. The communication interface 162 can include any suitable components for interfacing with one or more network(s), including for example, transmitters, receivers, ports, controllers, antennas, or other suitable components.

The additive manufacturing machine and refill sensing systems described above provides several advantages compared to conventional machines and systems. For example, by using powder level sensors, weight sensors, powder quality sensors, and/or vision systems on both the hopper and the powder supply system of the additive manufacturing machine, waste powder can be reduced or eliminated, resulting in decreased operating costs. In addition, machine components and process health may be continuously monitored and corrective maintenance may be used to eliminate costly repairs or machine downtime. Moreover, low dosing events or other manufacturing issues may be predicted and corrective action could be taken, and powder quality issues, such as the presence of foreign objects or contaminants, could be detected. Other advantages to the additive manufacturing machine and powder supply system will be apparent to those skilled in the art.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing machine defining a vertical direction, the additive manufacturing machine comprising:
   a build unit comprising a powder dispenser including a hopper for receiving a volume of additive powder;
   a gantry movably supporting the build unit within the additive manufacturing machine;
   a hopper sensing system operably coupled to the build unit, the hopper sensing system comprising:
      a powder level sensor positioned for detecting a level of additive powder within the hopper; and
   a powder supply system comprising a vibrating conveyor extending between a powder supply source and the hopper for transporting additive powder toward the hopper.

2. The additive manufacturing machine of claim 1, wherein the hopper sensing system further comprises:
   a weight sensor operably coupled to the hopper, the weight sensor configured for measuring a weight of additive powder within the hopper.

3. The additive manufacturing machine of claim 1, wherein the hopper sensing system further comprises a hopper vision system for mapping the additive powder within the hopper.

4. The additive manufacturing machine of claim 3, wherein the hopper vision system generates an image or visual representation of the amount and distribution of the additive powder within the hopper.

5. The additive manufacturing machine of claim 3, wherein the hopper vision system comprises a camera or optical laser scanning system fixed to the build unit.

6. The additive manufacturing machine of claim 1, wherein the hopper sensing system comprises a plurality of powder level sensors operably coupled with the hopper.

7. The additive manufacturing machine of claim 1, wherein the build unit comprises a scan unit, a weight sensor being positioned between the scan unit and the powder dispenser for determining the weight of the additive powder.

8. The additive manufacturing machine of claim 1, wherein the powder level sensor is operably coupled with the hopper and is configured for detecting when the additive powder within the hopper reaches a maximum level or a minimum level.

9. The additive manufacturing machine of claim 1, wherein the powder supply system comprises:
   the powder supply source for dispensing additive powder during a refill process;
   the vibrating conveyor extending between the powder supply source and a discharge for transporting dispensed additive powder toward the hopper; and
   a supply sensing system comprising:
      a powder level sensor positioned for detecting a level of additive powder within the powder supply source; and a weight sensor operably coupled to the powder supply source, the weight sensor configured for measuring a weight of additive powder within the powder supply source.

10. The additive manufacturing machine of claim 9, wherein the supply sensing system comprises a plurality of powder level sensors operably coupled with the powder supply source.

11. The additive manufacturing machine of claim 9, wherein the supply sensing system further comprises a refill vision system positioned adjacent to the discharge of the conveyor for detecting a powder quality of the dispensed additive powder.

12. The additive manufacturing machine of claim 11, wherein the refill vision system comprises a camera or optical laser scanning system fixed to the powder supply source.

13. The additive manufacturing machine of claim 9, further comprising a powder quality sensor for measuring at least one characteristic of the dispensed additive powder.

14. An additive manufacturing machine comprising:
a build unit comprising a powder dispenser including a hopper for receiving a volume of additive powder;
a gantry movably supporting the build unit within the additive manufacturing machine;
a powder supply system comprising a vibrating conveyor extending between a powder supply source and the hopper for dispensing additive powder during a refill process;
a hopper vision system for mapping the additive powder within the hopper; and
a refill vision system positioned proximate the conveyor for detecting a powder quality of dispensed additive powder.

15. The additive manufacturing machine of claim 14, further comprising a hopper sensing system operably coupled to the build unit, the hopper sensing system comprising:
a powder level sensor positioned for detecting a level of additive powder within the hopper; and
a weight sensor operably coupled to the hopper, the weight sensor configured for measuring a weight of additive powder within the hopper.

* * * * *